(12) United States Patent
Nicholson et al.

(10) Patent No.: US 10,503,708 B2
(45) Date of Patent: Dec. 10, 2019

(54) ANALYSING PHYSICAL SYSTEMS

(71) Applicant: McLaren Applied Technologies Limited, Woking, Surrey (GB)

(72) Inventors: Richard Nicholson, Weybridge (GB); Peter Schroder, Weybridge (GB); Anthony Richard Glover, Guildford (GB); Caroline Hargrove, Richmond (GB); James Thurley, Guildford (GB); Adrian Sureshkumar, Bisley (GB); Lee Cadman, Godalming (GB)

(73) Assignee: McLaren Applied Technologies Limited, Woking (GB)

( * ) Notice: Subject to any disclaimer, the term of this patent is extended or adjusted under 35 U.S.C. 154(b) by 483 days.

(21) Appl. No.: 15/192,103

(22) Filed: Jun. 24, 2016

(65) Prior Publication Data

US 2016/0378795 A1 Dec. 29, 2016

(30) Foreign Application Priority Data

Jun. 25, 2015 (GB) ..................................... 1511175

(51) Int. Cl.
*G06F 16/21* (2019.01)
*G06F 16/22* (2019.01)

(52) U.S. Cl.
CPC ........ *G06F 16/212* (2019.01); *G06F 16/2246* (2019.01)

(58) Field of Classification Search
CPC .... G06F 17/5022; G06F 17/5027; G06F 9/30; G06N 3/063; G06N 20/00; G06N 7/005
See application file for complete search history.

(56) References Cited

U.S. PATENT DOCUMENTS

| | | | | |
|---|---|---|---|---|
| 5,398,300 A | * | 3/1995 | Levey .................. | G06N 3/0427 706/16 |
| 2006/0085172 A1 | * | 4/2006 | Wilson ................ | G06F 17/5018 703/2 |
| 2016/0350337 A1 | * | 12/2016 | Mielenhausen ....... | G06F 16/211 707/999.003 |

* cited by examiner

*Primary Examiner* — Yuk Ting Choi
(74) *Attorney, Agent, or Firm* — Alston & Bird LLP

(57) ABSTRACT

A processing system for processing data defining behaviour of a physical system, the processing system being configured to operate on: (i) a plurality of data definition objects, each data definition object defining a method for computing one or more output result values for that object in dependence on one or more input values for that object; and (ii) a dependency schema defining one or more dependencies among the data definition objects, each dependency being such that a first data object is dependent on a second data object when the first data object takes as a required input value an output value of the second data object; the data processing system being capable of raising each data definition object to a computed state by executing the method defined in the respective data definition object to thereby compute one or more output values for that data definition object; and being configured to receive from a user an instruction indicating a request to raise a specific data definition object to a computed state, and in response to that instruction to automatically raise data definition objects on which that specific data definition object defines itself as being directly or indirectly dependent to a computed state.

10 Claims, 2 Drawing Sheets

ANALYSING PHYSICAL SYSTEMS

CROSS-REFERENCE TO RELATED APPLICATION

This application claims priority to and the benefit of United Kingdom Application No. 1511175.0, filed on Jun. 25, 2015, the disclosure of which including the specification, claims, drawings, and abstract; the contents of all of which as are hereby incorporated by reference in their entirety.

BACKGROUND OF THE INVENTION

Field of Invention

This invention relates to data processing systems, and techniques for modelling and analysing the behaviour of physical systems.

Related Art

In designing products such as aircraft, boats, road vehicles, and other complex machinery or electronic systems such as integrated circuits and discrete electronics components it is often desirable to model a candidate design and/or its operating environment, so as to be able to predict the behaviour of the design and, if necessary, identify areas for improvement. In modern design processes, simulations of this nature have replaced many instances where in the past tests would have been carried out on models or physical prototypes. Similar modelling tasks arise in other fields such as predicting sports performance and studying animal behaviour. Some relatively simple physical systems can be modelled efficiently by writing a comprehensive algorithmic model of the system's behaviour and then executing that model using a computer. This approach works well with systems that are well characterised mathematically and are not subject to change. For more complex systems this approach has a number of limitations.

To illustrate this, consider the example of modelling the behaviour of a high performance aircraft.

First, the modelling process is complicated by the fact that the aircraft may have a range of options such as external elements having differing aerodynamic properties, engines of different levels of performance, and different possible fuel loads; and the aircraft may need to be simulated under a range of conditions such as different ambient temperatures, air pressures and payloads. The choice of one option may influence the behaviour of another other option: for example the choice of a certain payload may influence the airflow over a chosen wing and hence the aerodynamic performance of the wing.

Second, the process of estimating the behaviour of the aircraft under certain options and conditions may be highly computationally intensive, meaning it is not feasible to immediately run a simulation, modelling or verification task on an arbitrary set of options and conditions: it may first be necessary to run a complex program requiring significant processor time in order to compute the predicted behaviour of the aircraft with the selected combination of options and conditions.

Third, the process of simply characterising the available options may involve significant work. For example, at the design stage a wing design may be characterised by data defining a set of curved shapes, a payload may be characterised by data defining a set of surface coefficients, mass and cross-section and an engine design may be characterised by data defining values such as power, fuel usage and component weights. These options all involve different parameters which must be brought together to contribute to the overall model of the aircraft when those options are selected. This involves a step additional to the fundamental design process. It will be appreciated that these difficulties are substantial obstacles to developing a working model of a changeable physical system such as an aircraft, a sports car or an ecological environment.

One way to address this problem might be to model each element individually, to store the models and then to combine them when options are selected so as to form an overall model. However, this would not yield an accurate result when the selection of one option has an effect on the behaviour of another option: for example when a payload influences airflow over a wing, or when a reduction in weight due to fuel consumption influences climb performance.

Another way to address the problem might be to develop models for each possible combination of options in advance, and then to invoke the appropriate model when a set of options has been designated for a simulation. However, the total number of possible combinations may be immense, and the amount of processor time needed to develop a model for each one may be significant, so this is not a practical solution.

Finally, whilst it might not be practical to develop a complete model of the physical system in advance of options being selected, it might at least be feasible to bring the disparate design data together manually to form a coherent set of the available options. However, even this would be a substantial task for a complex physical system, and it would need to be repeated as soon as further options became available, which might happen many times during the designing of a complex product.

There is a need for an improved system for processing data defining behaviour of physical systems.

BRIEF SUMMARY

According to one aspect of the present invention there is provided a processing system for processing data defining behaviour of a physical system, the processing system being configured to operate on: (i) a plurality of data definition objects, each data definition object defining a method for computing one or more output result values for that object in dependence on one or more input values for that object; and (ii) a dependency schema defining one or more dependencies among the data definition objects, each dependency being such that a first data object is dependent on a second data object when the first data object takes as a required input value an output value of the second data object; the data processing system being capable of raising each data definition object to a computed state by executing the method defined in the respective data definition object to thereby compute one or more output values for that data definition object; and being configured to receive from a user an instruction indicating a request to raise a specific data definition object to a computed state, and in response to that instruction to automatically raise data definition objects on which that specific data definition object defines itself as being directly or indirectly dependent to a computed state.

The dependency schema may be such as to in any embodiment described herein permit the set of objects on which a first object is dependent to vary depending on the execution of the method of the first object.

The processing system may be configured in any embodiment described herein to store the output values of each data object that is raised to a computed state.

The processing system may be configured to in any embodiment described herein automatically raise any data definition object ("subsidiary data definition object") on which the said specific data definition object is directly or indirectly dependent to a computed state by executing the method defined in the subsidiary data definition object only if one or more valid output values for the subsidiary data definition object are not stored.

The processing system may be configured in any embodiment described herein to, in response to the changing of data defined by a data definition object, automatically render any output value stored for that data definition object invalid.

The processing system may be configured in any embodiment described herein to, in response to the changing of data defined by a data definition object, automatically render any output value stored for any data definition object directly or indirectly dependent on that data definition object invalid.

The processing system may be configured in any embodiment described herein to, on receiving the said instruction from a user, process the content of the specific data definition object to determine which data definition objects that specific data definition object is directly or indirectly dependent on.

The processing system may be responsive in any embodiment described herein to the specific data definition object defining its dependency on another data definition object as optional to (i) if that other data definition object is in a computed state to make an output value of that other data definition object available to the specific data definition object and (ii) otherwise to not raise that other data definition object to a computed state.

According to a second aspect of the present invention there is provided a method for defining a configuration of a physical system, the method comprising: forming: (i) a hierarchical dataset indicating, for each of a plurality of configurable parts of the system, a set of multiple possible configurations of the respective part, (ii) first structural metadata defining which of those configurations are valid in combination, (iii) physical data defining at least one property of each configurable part in each of its possible configurations and (iv) second structural metadata defining how to combine the physical data to form a definition of the system; processing the hierarchical dataset to form an editor structure having a hierarchical structure that matches the structure of the hierarchical data structure; selecting by means of the editor structure a group of configurations such that the group of configurations comprises a single configuration for at least some of the configurable parts and the group of configurations is indicated by the first structural metadata to be valid in combination; forming third structural metadata defining the selected group of configurations; and forming a data object defining the configuration of the system by combining the physical data indicated by the third structural metadata in the manner defined by the second structural metadata.

The physical data and the second structural metadata may be in the same format in any embodiment described herein. They may be presented in files of the same file format.

The hierarchical dataset may define a plurality of nodes in any embodiment described herein. One of the nodes may be a descriptive node comprising a descriptive name. The step of processing the hierarchical dataset may comprise in any embodiment described herein forming the editor structure so as to include the descriptive name as a heading for subsidiary nodes of the said one of the nodes.

The hierarchical dataset may define a plurality of nodes in any embodiment described herein. One of the nodes may be a parameter node defining a value in any embodiment described herein. The step of processing the hierarchical dataset may comprise forming the editor structure so as to include the parameter node as a non-editable value in any embodiment described herein. One of the nodes may be a data node defining a value in any embodiment described herein. The step of processing the hierarchical dataset may comprise forming the editor structure so as to include the data node as an-editable value in any embodiment described herein. One of the nodes may be an option node defining a series of choices and for each choice one or more subsidiary nodes in any embodiment described herein. The step of processing the hierarchical dataset may comprise forming the editor structure so as to include the option node as a node whose value can be selected from among the choices in any embodiment described herein.

The step of processing the hierarchical dataset may comprise in any embodiment described herein forming the editor structure so that when one of the choices is selected as the value for the option node the subsidiary nodes defined for that choice are presented as subsidiary nodes of the option node.

BRIEF DESCRIPTION OF THE FIGURES

The present invention will now be described by way of example with reference to the accompanying drawings. In the drawings.

DETAILED DESCRIPTION OF VARIOUS EMBODIMENTS

Figure 1:
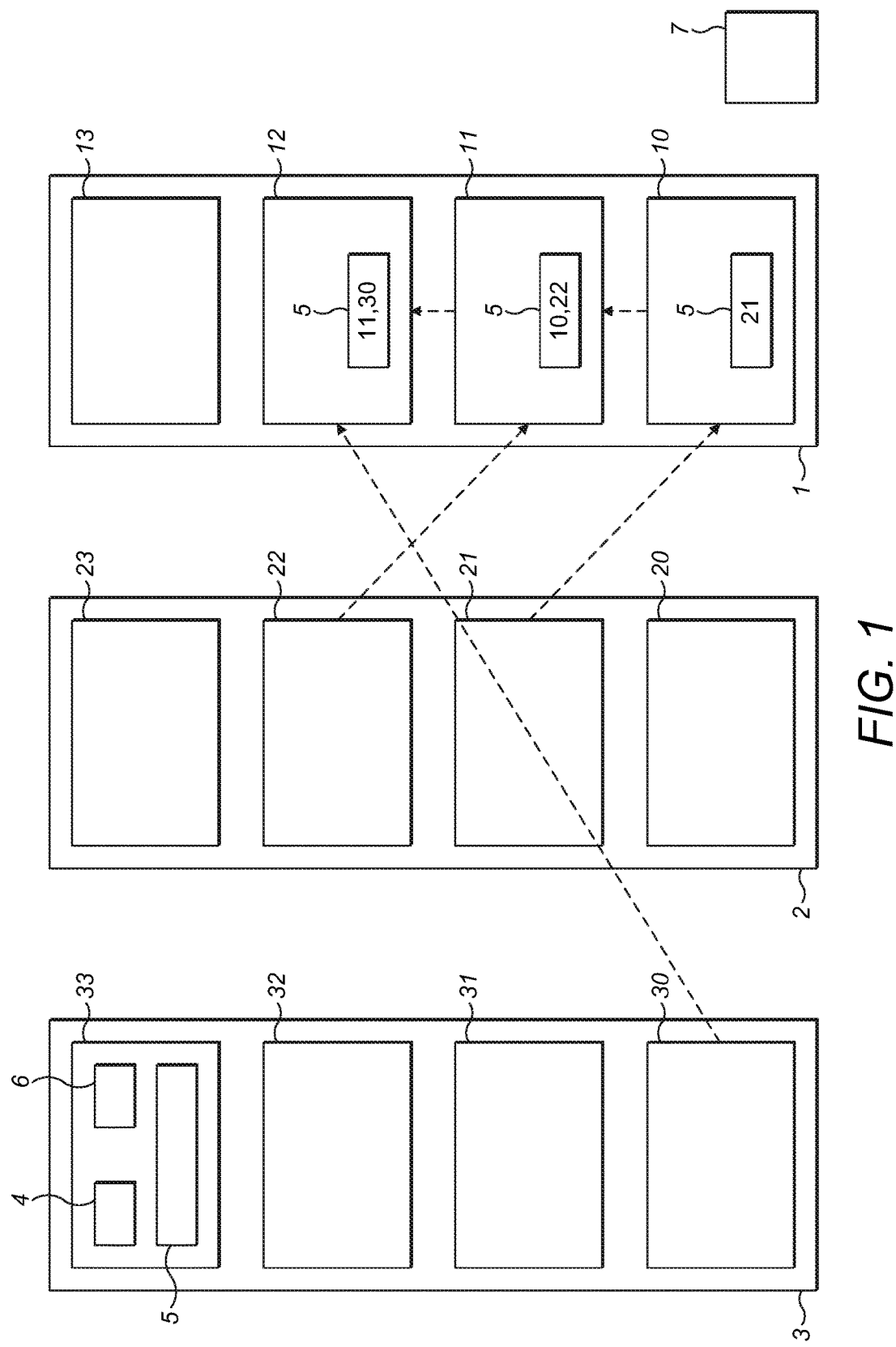
FIG. 1 illustrates data objects.

FIG. 1 illustrates a group of data objects for modelling interrelated parts of a physical system. For example, the objects may comprise a group 1 of objects 10, 11, 12, 13 which represent the simulated performance of an aircraft, a group 2 of objects 20, 21, 22, 23 which represent physical characteristics of the aircraft and a group 3 of objects 30, 31, 32, 33 which represent conditions under which the aircraft might operate. As illustrated in object 33, each object can comprise three elements: a method definition 4, a dependency definition 5 and, optionally, result data 6. The system also comprises a store 7 of constants.

Each group of data objects are a set of states for a model of the physical system that they represent. For example, each object in group 1 represents a respective state for the simulated performance of the aircraft. The lowest states (10, 20, 30) are referred to as the persistent configuration states. The next states (11, 21, 31) are referred to as the transient configuration states. The next states (12, 22, 32) are referred to as the persistent results states. The highest states (13, 23, 33) are referred to as the transient results states.

As indicated above, each data object comprises a method definition, a dependency definition and, optionally, result data. The method definition comprises either (i) code defining algorithmic operations to be performed on one or more inputs derived externally to the data object so as to form one or more outputs/results, or (ii) code defining a static output/result value. The dependency definition defines zero or more data objects from the same group as the data object in question or from other groups. The result data, if present, holds the result(s) of executing the method. These three elements interact on the following principles.

1. When the method of one data object is executed its outputs populate the result data of that object.
2. The result data of one data object can form an input to the method of another data object.
3. The dependency definition of a data object is a list of other data objects whose results are required as inputs to the method of that data object. (The effective content of the dependency definition may vary depending on the process flow of its method, as will be described below).

In FIG. 1 the dependency definitions 5 of some of the data objects identify other data objects on which the former data objects are dependent. For example, data object 10 is dependent on data object 21 and data object 11 is dependent on data objects 10 and 22. These relationships arise because the method of data object 10 requires as an input a result of the method of data object 21, and the method of data object 11 requires as an input results of the methods of data objects 10 and 22.

The data objects of each group represent the behaviour of a common component of the overall physical system: for example all the data objects 30-33 of group 3 represent certain environmental conditions.

In order to set up the system a user must arrange for the methods of the data objects of each group to be created. One way in which this may be done will be described below.

The method of the transient result state, together with the methods on which it is dependent, characterises the behaviour of its corresponding component to the fullest level, but to execute that method and all the methods on which it depends may require a considerable amount of processor time. It is advantageous for the user to divide the methods that characterise the behaviour of the component into multiple levels of increasing detail, as indicated in, e.g. objects 30 to 33. In that way, where another data object requires information about the track it might not be necessary to execute the method of the transient results state together with all the methods on which it depends. Instead it might be sufficient to execute the method of the transient configuration state together with any methods on which it depends. This can reduce the processor time required to execute other methods that depend on the state of the track. As an example, the states of the environmental conditions group might provide the following information:

Persistent configuration state (30): generalised static geographical information
Transient configuration state (31): detailed static geographic information
Persistent results state (32): as above plus mean meteorological information
Transient results state (33): as above plus estimated three-dimensional wind and pressure data points Another object might require the information of the persistent results state for the environmental conditions but not the information of the transient results state of the environmental conditions. By dividing the elements of the environmental conditions model up in this way, in order for such an object to be executed the environmental conditions group must be raised to the persistent results state but need not be raised to the transient results state. This reduces the amount of processor time needed to generate the result(s) for that other object.

The method of an object can be defined to be optionally dependent on another object. When one object is optionally dependent on another the former object will take as an input a result of the latter object if such a result is available, but the absence of such a result will not prevent the method of the former object from being executed. As an example, the persistent results state 12 of the aircraft performance group 1 may employ information about the meteorological conditions that are represented by group 3. If the environmental conditions object has been raised to the transient results level 33 then the three-dimensional wind vectors will be available and can be used as an input by the method of object 12. However, if the environmental conditions object has not been raised to that state object 12 can use the average meteorological provided by the transient configuration state 30 of the environmental conditions. In this example, the dependency definition of data object 12 would indicate its validity as being dependent on whether data object 33 exists or is available. If data object 33 were to be non-existent or unavailable then data object 12 could be valid. If data object 33 were to come into existence then object 12 would no longer be valid.

In one embodiment, when the system is required to execute the method of a "primary" data object it first automatically identifies which other data objects the primary data object is dependent on. That may be done by reading the dependency definition of that data object. More preferably it is done by starting execution of the data object, and halting execution once it has been determined that to complete execution one or more prerequisites from one or more other data objects is required. The system then issues a call for the methods of any data objects listed in that dependency definition to be executed. This process proceeds recursively, so that in preparation for the execution of the method of one data object the methods of all the data objects on which that data object is directly or indirectly dependent are automatically executed. Since the dependencies of each data object cascade automatically in this way there is no need for the dependency definition of an object to list data objects on which it is indirectly dependent.

Whether a data object is dependent on another data object may depend on the process flow within the former data object as it is executed: for example on the input data provided to the data object. It might therefore be unnecessary to execute all the methods on whose results the data object can be dependent in all of its possible states. It has been found that an efficient way to assess the dependencies of an object in its current state is simply to attempt to fully execute it, as described above.

When a user wishes to use the data processing system to obtain a result about a physical component represented by a group in the system, the user first determines which data object of that group will provide that result as an output from its method. The user then commands the data processing system to execute the method of that data object. The data processing system then automatically determines the dependencies of the object required by the user and executes any methods that are prerequisites for the object. This will result in all the results required to execute the method of the object required by the user becoming available. Finally the system executes the method of the object commanded by the user, generating the result required by the user.

Once the method of an object has been executed and the result(s) for that object generated, the results can be stored by the data processing system. This means that the system can avoid executing the method of that object again the next time those results are required. The system may be configured to subsequently automatically discard some or all of the results. Preferably, the system is configured to automatically discard the results of the transient results states and the transient configuration states in response to a predetermined event. For example, the system may be configured to automatically discard those results when the user who caused those results to be generated exits the system. This can help by freeing up storage space in the data processing system. Taking as an example the environmental conditions data listed above, the three-dimensional meteorological data from the transient results level may occupy a considerable amount of memory space. That space may be freed up automatically when the user exits, and the data re-computed if it is required subsequently. In contrast, the results of the persistent results and persistent configuration steps may be automatically stored until they are deleted by a user or otherwise invalidated, e.g. in the manner described below.

From time to time a user may change a method. This could happen when an improved algorithm is developed, or when the configuration of a component of the system changes. For example, the method of the persistent results state 32 of the environmental conditions object could be changed when an improved meteorological prediction algorithm becomes available; or the transient configuration state 21 of the aircraft could be dependent on another object that defines the aerodynamic performance of a wing, and if the user wants to simulate the performance of the aircraft with a different wing shape he could change the method of state 21 to refer to a different wing object. The dependencies between objects are predicated on the reliance of one object from data of another object. The data processing system may be arranged so that if the data in one object is changed then any object directly or indirectly dependent on that object is set as invalid. Furthermore, the system may optionally be configured so that if the method associated with an object is changed, that is taken to indicate that the data of that object, whilst still available, is no longer reliable. With that in mind, the data processing system may optionally be arranged so that when the method of an object is changed any results previously stored for that object are deleted or otherwise invalidated. The new method must then be executed if the results for that object are to be re-populated.

Furthermore, the system is configured so that when a method is changed any results stored for objects whose methods are dependent on that method are automatically invalidated. This is done by recursively checking the dependency definitions stored in the system to identify the data objects whose results are directly or indirectly dependent on results of the changed method.

When a user defines or changes a method he may edit the dependency definition for the corresponding data object. More preferably, the data processing system can automatically populate that dependency definition when the method is saved, by identifying other objects' data required by the method and storing a list of those objects as the dependency definition for the method in question. Those objects may be identified by being designated in the code of the method in question as objects on which the method in question is dependent, or alternatively could be identified from references to their data in the method in question.

The dependencies may be stored in a dedicated data structure. More preferably, the dependency structure is determined automatically in an iterative fashion at run time: i.e. when a use instructs the system to raise a certain object to a certain state. At that point the system can read the object in question, determine which objects it is dependent on, and raise those to a computed state if required. That process may be recursive, in that raising one of those latter objects to a computed state may require its code to be read and its dependencies implemented, and so on. Depending on the state of the system at the point when an object is to be raised to a particular state, the data in question can have different dependencies.

In more detail, the process of raising an individual data object to a computed state proceeds as follows:

1. The system calls the method associated with the data object without any input data, or with only the static input data provided by the end-user. The method is executed insofar as it is possible for it to do so without input data (or with limited input data) and returns an output. The output may be either (a) a computed result or (b) a list of one or more other prerequisites that depend on other data objects. The method of the objet in question is defined such that result (a) will be returned if the object does not depend on any other data objects and result (b) will be returned if it does depend on other data objects.
2. If result (a) is obtained then that result is made available to the end user. Otherwise, if result (b) (i.e. a list of prerequisites) has been returned then the data objects that provide those prerequisites are each raised to a computed state in the same manner as is being described in relation to the primary object. This may result in a series of recursive calls to other objects.
3. Once the objects associated with all the listed prerequisites have been raised to a computed state the system calls the method associated with the data object and provides the prerequisites as input data. The method is executed insofar as it is possible for it to do so that input data and returns an output. The output may be either (a) a computed result or (b) a list of one or more further prerequisites that depend on other data objects. The method of the object in question is defined such that result (a) will be returned if the object does not depend on any other data objects and result (b) will be returned if for the given input data it depends on further data objects beyond those listed at step 1.
4. If result (a) is obtained then that result is made available to the end user. Otherwise, if result (b) (i.e. a list of prerequisites) has been returned then the data objects that provide those prerequisites are each raised to a computed state in the same manner as is being described in relation to the primary object. This may result in a series of recursive calls to other objects.
5. The algorithm reverts to step 3, providing the method with the additional prerequisites derived during step 4.

The system may be configured to execute all the objects listed as forming dependencies of the primary object, or only those that are not currently in a valid state, as described above. This can allow the system to avoid executing subordinate objects unnecessarily.

It is useful to note certain points in respect of the algorithm described above. First, it allows for the dependencies of the object to vary independence on the input data provided. As an example, in the case of an aircraft the performance model of one wing option may vary in dependence on fuel load, whereas the performance model of another wing option may be independent of fuel load. If a wing-related object is called with the former wing specified then the algorithm may revert to a fuel consumption object to estimate fuel load, whereas this can be automatically omitted if the second wing is specified. Second, by initially executing the primary method without input data from any prerequisites provided by other objects it permits the prerequisites to be built up from a standing start, with only those subordinate objects that are required to support the primary object in its current input data configuration having been executed. Third, it should be noted that throughout the algorithm the system keeps track of which prerequisites have been requested by attempting to execute an object and finding a required operand as yet unavailable, rather than by scanning the code of the object in question and identifying variables used in its computations. Again, this means that only those prerequisites that are required for the object in its current configuration of input data are computed.

A user may raise an object to a computed state either by having the system execute the method for that object or by manually populating the results for that object.

Figure 2:
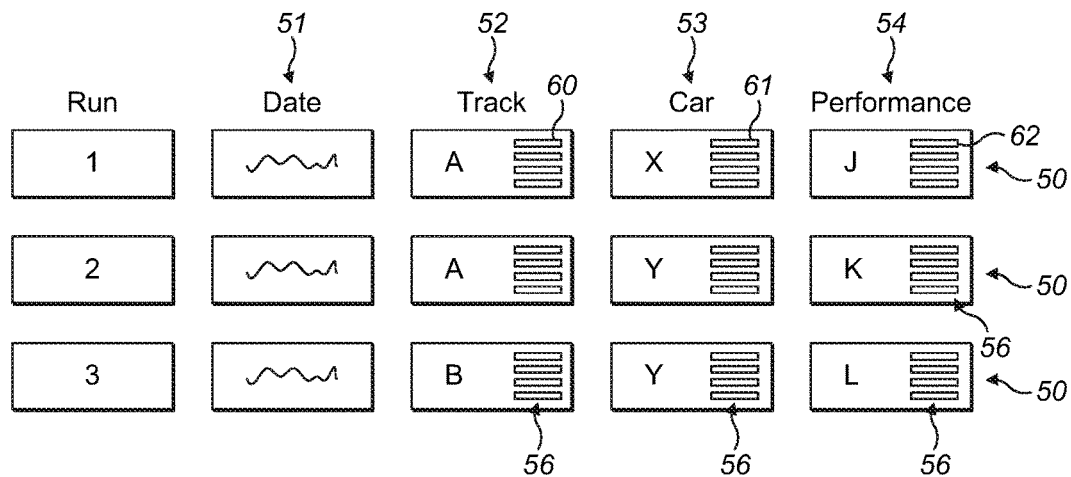
FIG. 2 shows a user interface.

FIG. 2 illustrates a user interface for implementing the system described above. The user interface comprises a set of rows 50 and a set of columns e.g. 51-54. At the intersections of the rows and columns are zones (e.g. 60, 61, 62). Each zone can represent a group of data objects. For example, zone 60 can represent group 3, zone 61 can represent group 2 and zone 62 can represent group 1. The data objects in a column represent a common characteristic of the physical system, for example the objects in column 52 may all represent environmental conditions (e.g. in different regions of the world), and the objects in column 53 may all represent aircraft behaviour. The set of data objects in a row represent data objects that are associated in a common logical relationship, so that the data objects in a row depend on other objects in that row but not on objects from other rows. In that way each row may represent a single run or a single simulation. The system may be configured so that some of the zones at intersections of rows and columns can represent static values: for example the zones in column 51 could represent dates. Alternatively, static data could be defined as the content of a data object.

The zones that represent groups of data objects may contain indicators 56. Those indicators may represent the data objects in that group for which valid results are available. This information can be represented in various ways, but in one example each indicator corresponds to one of the available data objects or states, and has two available appearances. One appearance indicates that the results of the corresponding data object or state are available, and the other indicates that the results of the corresponding data object or state are unavailable. This information can be helpful to the user in controlling the operation of the data processing system, for example in judging how long it will take for a certain computation to be performed. In an alternative embodiment the availability of results for a group might not be indicated by the respective zone.

As indicated above, the method of a data object may represent a complex physical system. Examples include aircraft, sports cars, environmental conditions and race tracks. The system may have a hierarchy of multiple sub-parts each of which can be configured in multiple different ways: for example an aircraft could have a sub-system representing the behaviour of its engine and another sub-system representing the behaviour of its wings. The engine sub-system could have sub-systems representing the behaviour of the fuel supply and electronic control set-ups and the wing sub-system could have sub-systems representing variable elements of the wing. Those variable elements could be adapted by a user to represent different wing configurations. In a complex system there may be hundreds or thousands of these sub-systems. It can be extremely cumbersome to define the method for a data object having so many possible options.

In another example, the objects 20, 21, 22, 23 could represent physical characteristics of a car, and the group 3 of objects 30, 31, 32, 33 could represent characteristics of race tracks.

Figure 3:
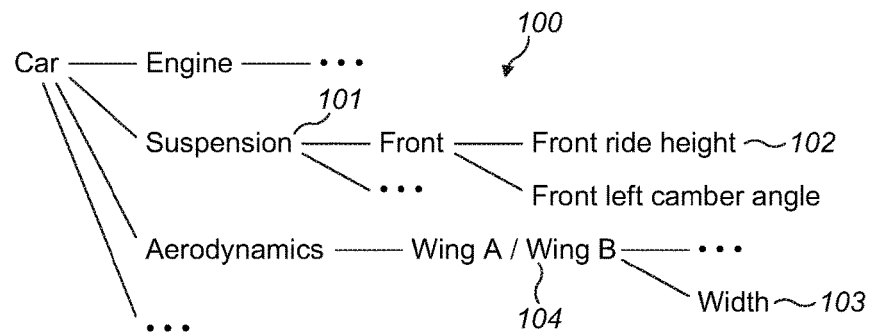
FIG. 3 shows a hierarchical data structure.

FIG. 3 illustrates an arrangement for facilitating the definition of a method representing the behaviour of a complex physical system. In this example the system is a car.

Figure 4:
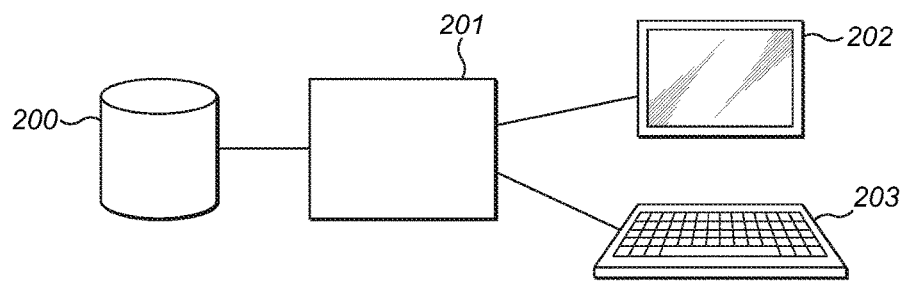
FIG. 4 shows a data processing system.

Conceptually, the complex physical system illustrated in FIG. 3 is considered to be represented by a hierarchical tree structure composed of a series of nodes as illustrated at 100 in FIG. 4. Each node of the tree represents a sub-system. In order to enable a user to readily configure the representation of the physical system each node can be:

a category: i.e. a heading indicating the nature of the nodes below that node in the hierarchy; for example node 101 which indicates that the nodes below it relate to a car's suspension;

a parameter: i.e. a value that can be changed by a user; for example node 102 which indicates elevator angle;

data: i.e. a value that cannot be changed by a user during normal operation; for example node 103 which indicates a wing width;

an option: i.e. a list of choices from which a user can select; for example node 104 which indicates a wing choice.

An option node can be used to permit a user to quickly alter a group of related nodes lower than the option node in the hierarchy. For each choice available for the option node the system stores a respective hierarchy of nodes below that node. The hierarchy that applies at any particular time depends on which choice is selected for the option node. For instance, an option node may have the choices "wing design A" and "wing design B", and depending on which of those choices is selected the tree structure below that option node is populated with the nodes appropriate to the selected wing design.

Once a structure of this type has been set up it allows a user to readily define the characteristics of a physical system by making choices at the option nodes and editing parameters to the appropriate values. However, setting up such a structure before the user accesses it, and translating the inputs that the user makes within the structure into a mathematical definition of the behaviour of the system can be extremely time-consuming. These problems can be addressed in the manner to be described below.

First, the following series of datasets is constructed:

1. A first dataset that defines the architecture of the hierarchical node structure. This dataset includes, for each choice at an option node, the series of nodes that will be present below that option node if the respective choice is selected, together with their default values. The first dataset includes the category nodes, which are present to assist a user to navigate the structure; the parameter nodes, which define normally fixed values; the data nodes, which define values that can be altered by the user; and the option nodes including their choices and the nodes dependent on each of those choices. Thus the first dataset defines the theoretically possible configurations of the system. The first dataset can be written in a text-based format.

2. A second dataset that defines which of the possible configurations of the first dataset are valid in combination. For example, in the case of modelling a car it may in practice be impossible to attach a certain front wing to the car if the ride height of the car is not above a certain value. The second dataset exists to prevent an invalid combination of theoretically possible configurations being selected at the same time. The second dataset can be written in a text-based format.

3. A third dataset comprising code that defines, for each sub-node or group of sub-nodes the influence of that node on the performance of the overall physical system. For example, the third dataset may comprise code defining the aerodynamic properties of a front wing "A", when "front wing A" is available as a choice for the "front wing" option node of the hierarchy. Conveniently, the third dataset may be defined as a set of discrete data files, each pertaining to a respective part of the system. This is convenient for the users whose task it is to write the parts of the third dataset, since the dataset can then be divided into logical sub-parts. The third dataset can conveniently be written in an engineering metadata language, such as MATLAB code.

4. A fourth dataset defining how the elements of the third dataset should be combined together to form a coherent definition of the behaviour of the physical system. When the third dataset is constituted as a set of discrete files the fourth dataset can be a further file that indicates how those files can be combined together in a logically consistent way. The fourth dataset can conveniently be written in an engineering metadata language, such as MATLAB code.

It will be appreciated that by dividing the characterisation of the system up in this way, the required datasets are relatively straightforward to define in the normal course of an engineering project. The fourth dataset can be written as a means of bringing together the definitions of individual parts of the physical system. When an engineer designs a new part of the physical system he can write the appropriate third metadata associated with that part, in compliance with the format of the fourth dataset, and can populate the second dataset, if required, to take account of any constraints on the usage of the new part. Finally, he can edit the first dataset to include the new part as a choice, with the invariant characteristics of the part as data nodes below that choice and the adjustable characteristics of the part as parameter nodes below that choice.

When a user comes to perform data analysis on the physical system, for example by using the system described above with reference to FIG. 2, he requires code (e.g. the method of a data object such as 22) to define the behaviour or other properties of the system. Once the four datasets described above have been formed, that code can readily be formed in the following way.

A data processing system has been programmed to automatically parse the first dataset, defining the hierarchy of nodes, to populate a user interface that can act as an editor whereby user can select the desired configuration of the physical system. For instance, the user interface can be capable of displaying the nodes of the system. At a category node the user interface can display the name/heading of the category and an interaction element actuation of which causes the nodes immediately below the category node to be displayed or hidden. At a parameter node the user interface can display the value of the parameter node in a non-editable form. At a data node the user interface can display the value of the data node in an editable form. At an option node the user interface can display the choices associated with that option (e.g. in a drop-down list format) and can display at least the nodes immediately below the option node given the selected choice. The user interface also has an option for the user to save a current configuration of the hierarchy (i.e. a given set of data values and choices). The data processing system is programmed also to take as input the second dataset, and to prevent the user from adopting a configuration of the hierarchy that is indicated by the second dataset as invalid.

In a first step to forming the required code, the data processing system is caused to parse the first dataset and present the user interface to the user, permitting the user to configure the hierarchy in compliance with the restrictions defined by the second dataset. That configuration can then be saved as a fifth dataset.

The data processing system has also been programmed to read the fifth dataset, and to process it in accordance with the fourth dataset to form the required code. For each section of the hierarchy defined in the fifth dataset the data processing system interrogates the fourth dataset to establish how code defining the performance of that the corresponding section of the physical system should be integrated into the required code as a whole. For example, the fourth dataset may define function names and variable names that are to be used to express the characteristics of that section of the physical system. The data processing system then accesses the relevant part of the third dataset that defines the performance of that section of the physical system, and integrates it into the data that will form the required code, in the manner defined in the fourth dataset. For example, when the fifth dataset indicates that front wing "A" has been selected the data processing system accesses the section of the third dataset that defines the performance of front wing "A" and integrates that into the data that will form required code.

In a second step to forming the required code, the third, fourth and fifth datasets are processed by the data processing system in the manner described in the preceding paragraph. This results in a set of code that can then be used as a method in a system of the type described with reference to FIG. 2.

The dependency of any object on other objects is defined by data internal to that object and not by a separate data structure. This allows the set of dependencies of an object to be readily configured, in a self-contained way, when that object is created or edited by a user. When the system is instructed (either directly, or indirectly through dependency) to raise an object to a computed state the system reads the definition of that object and thereby determines its dependencies. This is done at run-time using the algorithm described above.

The dependencies of an object can be mandatory or optional. In one embodiment, if an object (object A) has a mandatory dependency on another object (object B) then the system will raise object B to a computed state as part of its task of raising object A to a computed state. If object A has an optional dependence on object B then the system will make the output data of object B available to object A if object B is already in a computed state, but otherwise will not raise object B to a computed state and will not provide output data of object B to object A. This feature may be used to allow a computation to have access to accurate data if available, but otherwise to use less accurate data. For example, a flight model object may be made optionally dependent on a fully detailed wing model object (so data from that fully detailed model will be used if available) and mandatorily dependent on a basic wing model object. The mandatory and optional dependencies of an object can be discovered through attempting to fully compute the method of the object, in the manner described above.

FIG. 4 shows an example of a data processing system that can be used to implement the processing steps discussed above. The data processing system comprises a data store 200, a central processing unit 201 and user output device 202 such as a monitor and a user input device 203 such as a keyboard or mouse. The data store may be distributed over multiple physical data storage units. The central processing unit may be distributed over multiple physical processors. Program code to be executed by the central processing unit is stored in non-transient form in data store 200. Definitions of the data objects (e.g. 10-33), including their methods, dependency data and results, constant data 7 and the first to fifth datasets can be stored in the same way. The central processing unit can execute the code and the methods, and can read the appropriate other stored data to generate results and to cause information such as the user interface shown in FIG. 3 and the editor user interface described above to be presented to a user. The user can provide inputs in the normal way using the input device 203 to direct the operation of the system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A processing system for processing data defining behaviour of a physical system, the processing system being configured to operate on:
   (i) a plurality of data definition objects, each one of said plurality of data definition objects defining a method for computing one or more output result values for said one of said plurality of data definition objects in dependence on one or more input values for said one of said plurality of data definition objects, the method representing behavior or other properties of a complex physical system; and
   (ii) a dependency schema defining one or more dependencies among the data definition objects, each dependency being such that a first data object is dependent on a second data object when the first data object takes as a required input value an output value of the second data object;
   the data processing system being configured to:
   selectively raise each one of said plurality of data definition objects to a computed state by executing the method defined in each one of said plurality of data definition objects to thereby compute one or more output values for each one of said plurality of data definition objects; and
   receive from a user an instruction indicating a request to raise a specific one of said plurality of data definition objects to a computed state, and in response to the received instruction to:
   automatically raise one or more data definition objects on which said specific one of said plurality of data definition objects defines itself as being directly or indirectly dependent to a computed state, said automatic raising occurring by recursively executing the method defined in each of said one or more data definition objections on which said specific one of said plurality of data definition objects defines itself as being directly or indirectly dependent upon, the computed state generating one or more output values for said one or more data definition objections on which said specific one of said plurality of data definition objects defines itself as being directly or indirectly dependent upon; and
   once all of said one or more data definition objections on which said specific one of said plurality of data definition objects defines itself as being directly or indirectly dependent upon have been raised to said computed state with said generated one or more output values, automatically execute the method defined in said specific one of said plurality of data definition objects, said execution using said generated one or more output values to compute one or more output values for said specific one of said plurality of data definition objects.

2. The processing system as claimed in claim 1, wherein the dependency schema is such as to permit the set of objects on which a first object is dependent to vary depending on the execution of the method of the first object.

3. The processing system as claimed in claim 1, wherein the processing system is configured to store the output values of each data object that is raised to a computed state.

4. The processing system as claimed in claim 3, wherein the processing system is configured to automatically raise any one or more of said plurality of data definition objects on which the said specific data definition object is directly or indirectly dependent to a computed state by executing the method defined in the one or more of the data definition objects in response to one or more valid output values for the one or more of the data definition objects not being stored.

5. The processing system as claimed in claim 4, wherein the processing system is configured to, in response to the changing of data defined by a data definition object, automatically render any output value stored for the data definition object containing changed data invalid.

6. The processing system as claimed in claim 5, wherein the processing system is configured to, in response to the changing of data defined by a data definition object, automatically render any output value stored for any data definition object directly or indirectly dependent on the data definition object containing changed data invalid.

7. The processing system as claimed in claim 3, wherein the processing system is configured to, in response to the changing of data defined by a data definition object, automatically render any output value stored for the data definition object containing changed data invalid.

8. The processing system as claimed in claim 7, wherein the processing system is configured to, in response to the changing of data defined by a data definition object, automatically render any output value stored for any data definition object directly or indirectly dependent on the data definition object containing changed data invalid.

9. The processing system as claimed in claim 1, the processing system being configured to, on receiving the said instruction from a user, process the content of the specific data definition object to determine which ones of said plurality of data definition objects the specific one of said plurality of data definition objects is directly or indirectly dependent on.

10. The processing system as claimed in claim 9, the processing system being responsive to the specific data definition object defining its dependency on another data definition object as optional to (i) if said another data definition object is in a computed state to make an output value of said another data definition object available to the specific data definition object and (ii) otherwise to not raise said another data definition object to a computed state.

* * * * *